United States Patent Office 3,526,560
Patented Sept. 1, 1970

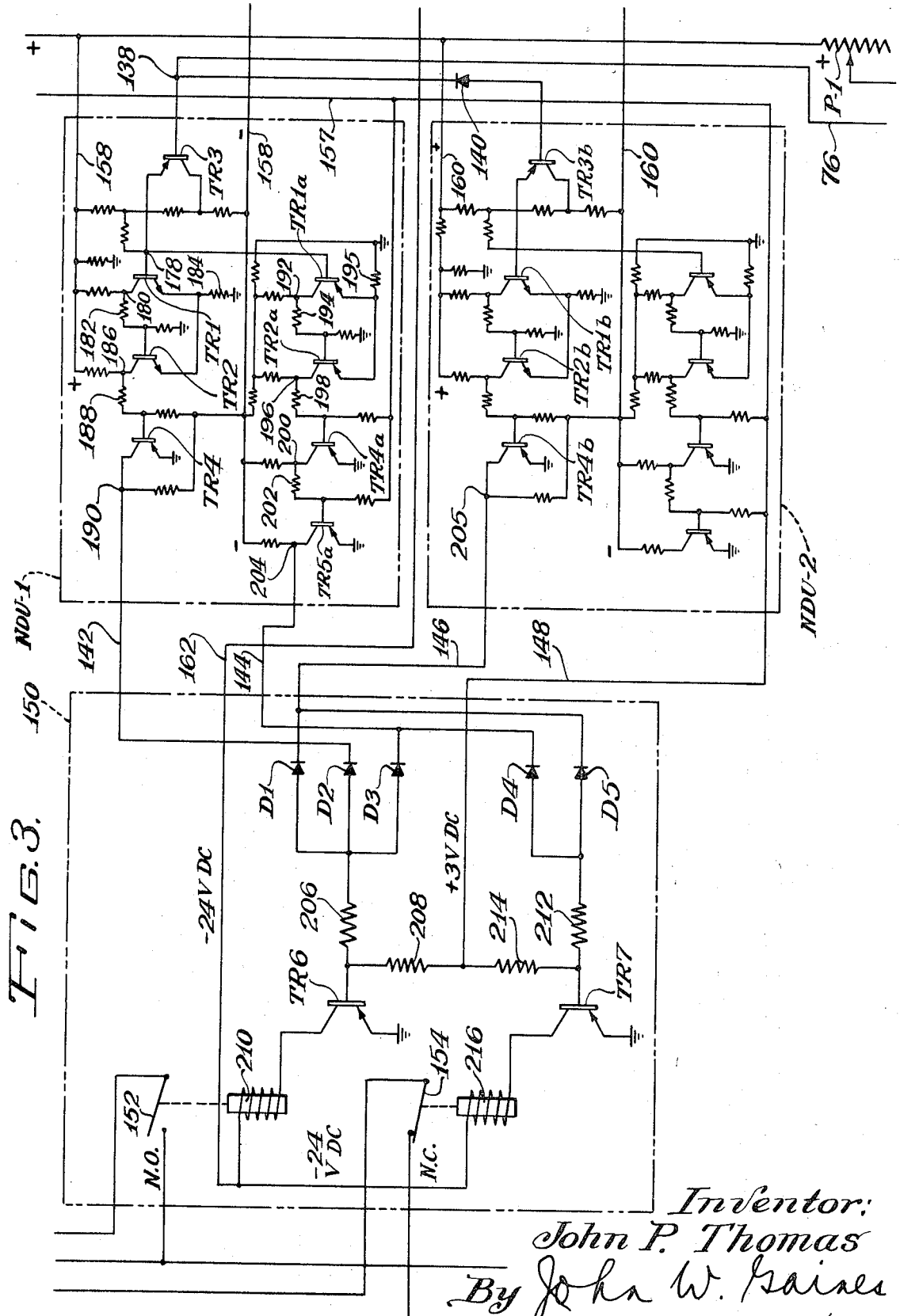

3,526,560
ETCHANT REGENERATION APPARATUS
John P. Thomas, Boalsburg, Pa., assignor to Chemcut Corporation, College, Pa., a corporation of Pennsylvania
Filed Feb. 13, 1967, Ser. No. 615,443
Int. Cl. C23b *3/00;* C23f *1/02*
U.S. Cl. 156—345                                                6 Claims

ABSTRACT OF THE DISCLOSURE

A fully automatic regeneration apparatus for the metal-etching etchant used in a spray etcher for industrial articles. The apparatus comprises an injector for injecting elemental halogen into the etchant to regenerate it from the oxidation state of its exhausted condition to the fully oxidized state of its fresh condition, a specific gravity float valve for introducing water into the etchant to maintain a constant etch rate, and a float-controlled overflow valve to drain off and store, as a byproduct in a storage tank, the accumulating excess of etchant which is continually being generated by the etching-regeneration process.

---

This application is a companion case to the same assignee's copending Benton U.S. patent application Ser. No. 450,671 filed Apr. 26, 1965, now abandoned, of which the disclosure is incorporated in entirety herein by reference. Such copending application relates to an aspect of regenerating etchant in use in an industrial etcher, and is primarily concerned with halogenating devices for regenerating the etchant to the fully oxidized state of its fresh condition, and automatic controls effective to sense reliably and accurately the relative oxidation state of the etchant at all times and to activate the halogenating device as soon as and as long as the etchant requires re-oxidation.

The present invention relates to apparatus as stated in the abstract paragraph foregoing, and particularly to such apparatus which handles and monitors all phases of the complex, overall chemical process of etchant regeneration completely, continuously, and fully automatically.

The problem heretofore in industrial etchant regeneration operations, irrespective of whether the actual re-oxidation is accomplished automatically or not, has been that the chemical tests and additions, the drawing off, the dilutions, and other in-process adjustments and alterations of the etching solution were done, when in fact done at all, largely according to the convenience and availability of the operator. Therefore, there was no timed or systematic follow-up control according to some practices in the past, and the continuously or periodically necessary, complete tests of the circulating solution and the desirably maintained fixed ratio or blending of the ingredients or operations have been accomplished less by system or strictly applied science, and more by the operator's eye or other estimate, and as time allowed.

My invention substantially eliminates the foregoing problem, establishing a system of close controls and materially reducing the chances of operator's oversight or error, all as will now be explained. Features, objects, and advantages will either be specifically pointed out or become apparent when, for a better understanding of the invention, reference is made to the following description taken in conjunction with the accompanying drawings which show a preferred embodiment thereof and in which:

FIG. 3 is a schematic electrical diagram, showing a portion of the FIG. 2 schematic in greater detail.

Figure 1:
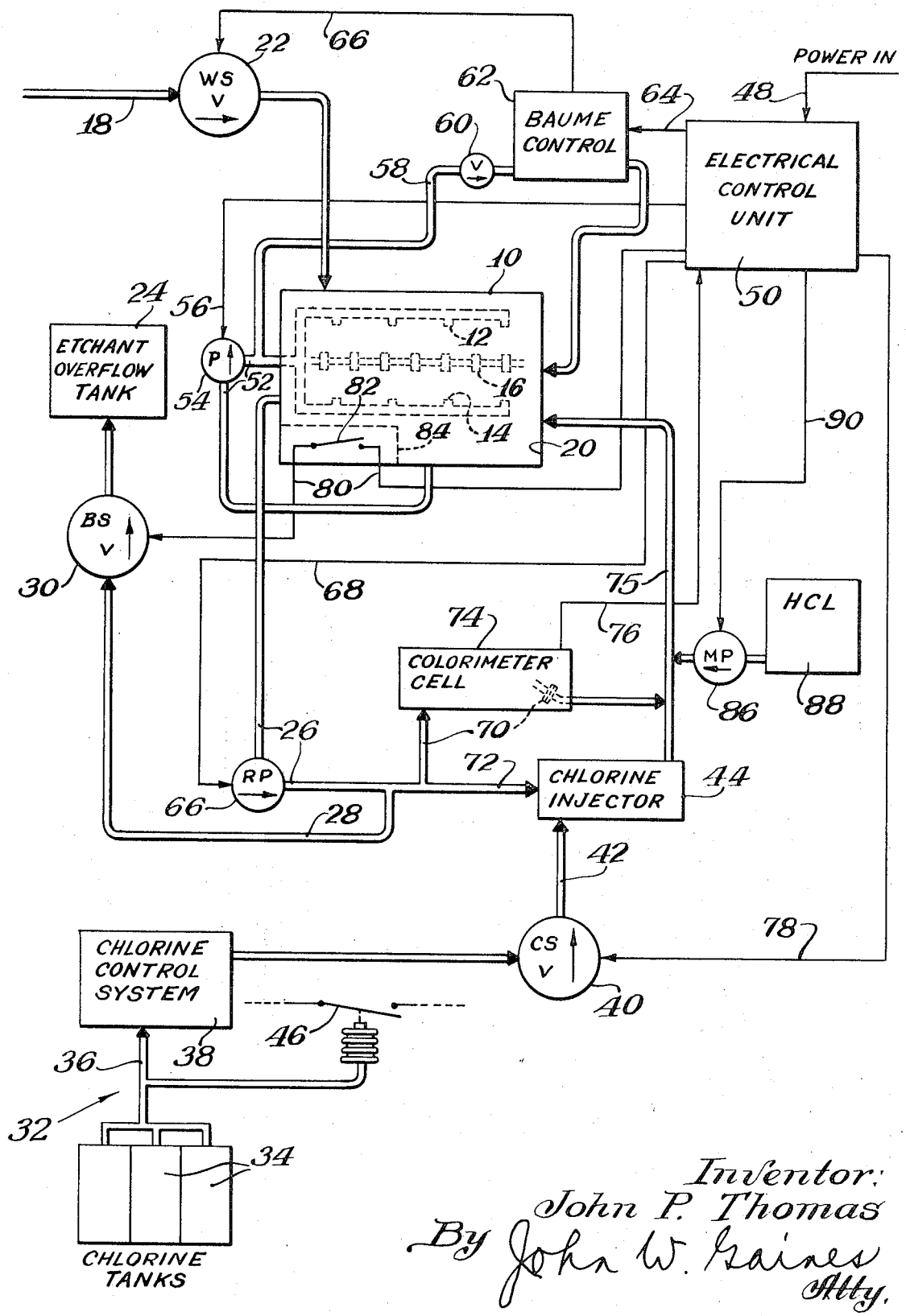
FIG. 1 is an electrical-hydraulic circuit diagram of a spray etcher having regeneration in accordance with my invention.

More particularly in FIG. 1 of the drawings, a conveyorized spray etcher 10 is shown having sets of down-spraying upper nozzles 12, sets of upspraying lower nozzles 14, and a continuously power driven, horizontal roller table between the sets of spray nozzles which forms a longitudinally disposed conveyor 16 in the etcher for moving therethrough a continuous series of articles to be etched.

In operation of the etcher, an etchant solution is sprayed from the upper nozzles alone, or from the upper and lower nozzles together, against the confronting metal surfaces of the articles, without any effect on selected areas of the articles, which are the so-called image areas that are coated with an organic etch-resist to protect the metal from attack. The remaining or nonimage areas of the articles are exposed, however, to the pressure induced sprays, and so the metal is removed therefrom and goes into solution in the etchant, making the etchant denser as the metal content thereof increases. To compensate for the continual addition of metal to the etchant, the etcher has several external service connections.

EXTERNAL SERVICE CONNECTIONS

While the etcher 10 is running, water feeding through a pipe 18 is added to an etchant tank 20 in the bottom of the etcher, diluting the body of etchant in the tank so that the specific gravity due to increasing metal content does not become excessive and so that a uniform etch rate is maintained. Thus from time to time water flows in a path leading from the pipe 18, through a water solenoid valve 22, and into the tank 20, temporarily raising the etchant level in the tank.

As a valuable chemical byproduct, excess etchant generated during operation of the system is withdrawn at intervals and pumped into a storage tank 24. Etchant thus flows in a path leading from a regeneration circuit 26, through a first circuit branch 28, thence through a by-product solenoid valve 30 and into storage in the tank 24.

During steady state running of the etcher, an oxidizing gas is added automatically and almost constantly to the etchant to regenerate the exhausted portion back to the high oxidation state of its fresh etching condition. A circuit 32 provided as a halogenation source for this purpose admits the gas through a path leading from a bank of compressed gas cylinders 34, through a gaspipe 36, a control 38 including pressure and flow regulators, a solenoid valve 40 in circuit with the control 38, and thence through a pipe 42 into a gas-to-liquid injector 44. The control 38 reacts to vacuum drawn in the injector due to liquid flow therethrough, and operates in accordance with known commercial practices to make the gas available only when the valve 40 is open and etchant is flowing through the injector. Otherwise, the control 38 blocks the flow to avoid having unwanted gas to enter the injector 44, while empty, and thereafter to enter, and escape to the outside from, the etcher.

An interconnecting conduit communicates gas pressure from the gaspipe 36 to the capsule of a pressure switch 46 which must be actuated into the closed position, indicative of sufficient gas pressure, before the system will commence operation.

Power wires 48 supply three phase current to the electrical control unit 50 of the system.

The system includes a main etchant circuit 52 and the regeneration circuit 26.

MAIN ETCHANT CIRCUIT

In the main circuit 52, a pump unit 54 comprising a main pump and an electric motor for driving same receives power through a connection 56 leading from the control unit 50. The pump unit 54 draws etchant from the tank 20 of the etcher, and the pump output for the most part flows to the nozzles 12 or to the nozzles 12 and 14 together, sprays therefrom under pressure, impinges upon the articles, and drains therefrom and then collects in the tank.

A minor portion of the pump output returns to the tank 20 in a branch path leading from an output branch 58, through a metering valve 60, and thence through a specific gravity responsive control 62 from which such portion of the etchant returns to the tank. The control 62 has one electrical connection 64 leading from the electrical control unit 50 and has another connection 65 leading to the water solenoid valve 22, causing water admission to the etcher to occur in response to the etchant having a high specific gravity.

REGENERATION CIRCUIT

In the regeneration circuit 26, a regeneration pump unit 66 which provides the circulation comprises a driven pump, and an electric drive motor having a set 68 of connections to the electrical control unit 50 for receiving power to drive the pump. The circuit 26 on the pump output side divides three ways into the first branch 28, a second branch 70, and a third branch 72. Etchant in the second branch 70 enters a colorimeter cell 74 included therein and flows from the cell into a regeneration return pipe 75 which is connected to the etcher tank 20. The cell 74 senses the oxidation state of the etchant by measuring the opacity, and the output of the cell is communicated to the electrical control unit by an interconnection 76.

In the third circuit branch 72, etchant enters the gas injector 44, picks up the gas, if available, and chemically reacts therewith, and flows into the return pipe 75 connected to the etcher. The electrical control unit 50 and the solenoid valve 40 have an interconnection 78 controlling the valve to enable the gas to flow to the injector 44.

The electrical control unit 50 and the bypass solenoid valve 30 have an interconnecting electric line 80 which includes a float controlled switch 82 and by which the valve is operated to enable excess etchant to transfer into the storage tank 24. The switch 82 is part of a float mechanism 84.

The following examples are given by way of illustration and not of limitation. Chlorine gas is the elemental halogen employed, it being understood that chlorine and chlorinating apparatus and controls are at the present time in widespread use and readily available commercially. An aqueous etchant solution is used, in which the etching agent is predominantly a polyvalent metal chloride of the metal being etched.

EXAMPLE 1

The objects are ferrous articles or at least ferrous surfaced articles, chlorine is in the gas cylinders, and the preferable etchant is therefore an aqueous ferric (FeCl$_3$)-ferrous (FeCl$_2$) chloride solution. The resulting redox action continuously generates more of the iron chloride:

| 2FeCl$_3$ $\xrightarrow{Fe}$ | 3FeCl$_3$ $\xrightarrow{Cl_3}$ | 2FeCl$_3$ $\xrightarrow{Fe}$ FeCl$_3$ | 3FeCl$_3$ $\xrightarrow{Cl_3}$ FeCl$_3$ | 2FeCl$_3$ $\xrightarrow{Fe}$ FeCl$_3$ FeCl$_3$ |
|---|---|---|---|---|
| High oxidation state of its fresh condition. | Low oxidation state of its exhausted condition. | High oxidation state etc. | Low oxidation state etc. | |

One common material that is etched is steel sheet, and examples of the products made during the operation are thin steel gridworks and flat steel springs. The details are omited because they will be evident from a consideration of Example 2 to follow, which is now fully described.

EXAMPLE 2

The objects etched are copper articles or at least copper surfaced articles, the gas is chlorine, and the preferable etchant is therefore an aqueous copper chloride solution. The resulting redox action continuously generates more of the copper chloride:

| CuCl$_2$ $\xrightarrow{Cu}$ | 2CuCl $\xrightarrow{Cl_2}$ | CuCl$_2$ $\xrightarrow{Cu}$ CuCl$_2$ | 2CuCl $\xrightarrow{Cl_2}$ CuCl$_2$ | CuCl$_2$ $\xrightarrow{Cu}$ CuCl$_2$ CuCl$_2$ |
|---|---|---|---|---|
| High oxidation. | Low oxidation. | High oxidation. | Low oxidation. | High oxidation. |

One of the large volume products is the printed etched circuit board, the blanks of which consist of a thin copper laminate affixed on one or both sides of a substrate such as a rectangular composition-insulator board.

Preferably a low level of acidity is maintained in the etchant to prevent the cuprous chloride (CuCl) from precipitating. So a pump 86 (FIG. 1) is employed to supply hydrochloric acid from a tank 88 into the common return pipe 75. Electric current in a conductor 90 leading from the control unit 50 supplies power to the pump 86 which consists of an electric driving motor and a small displacement, acid metering pump device.

Figure 2:
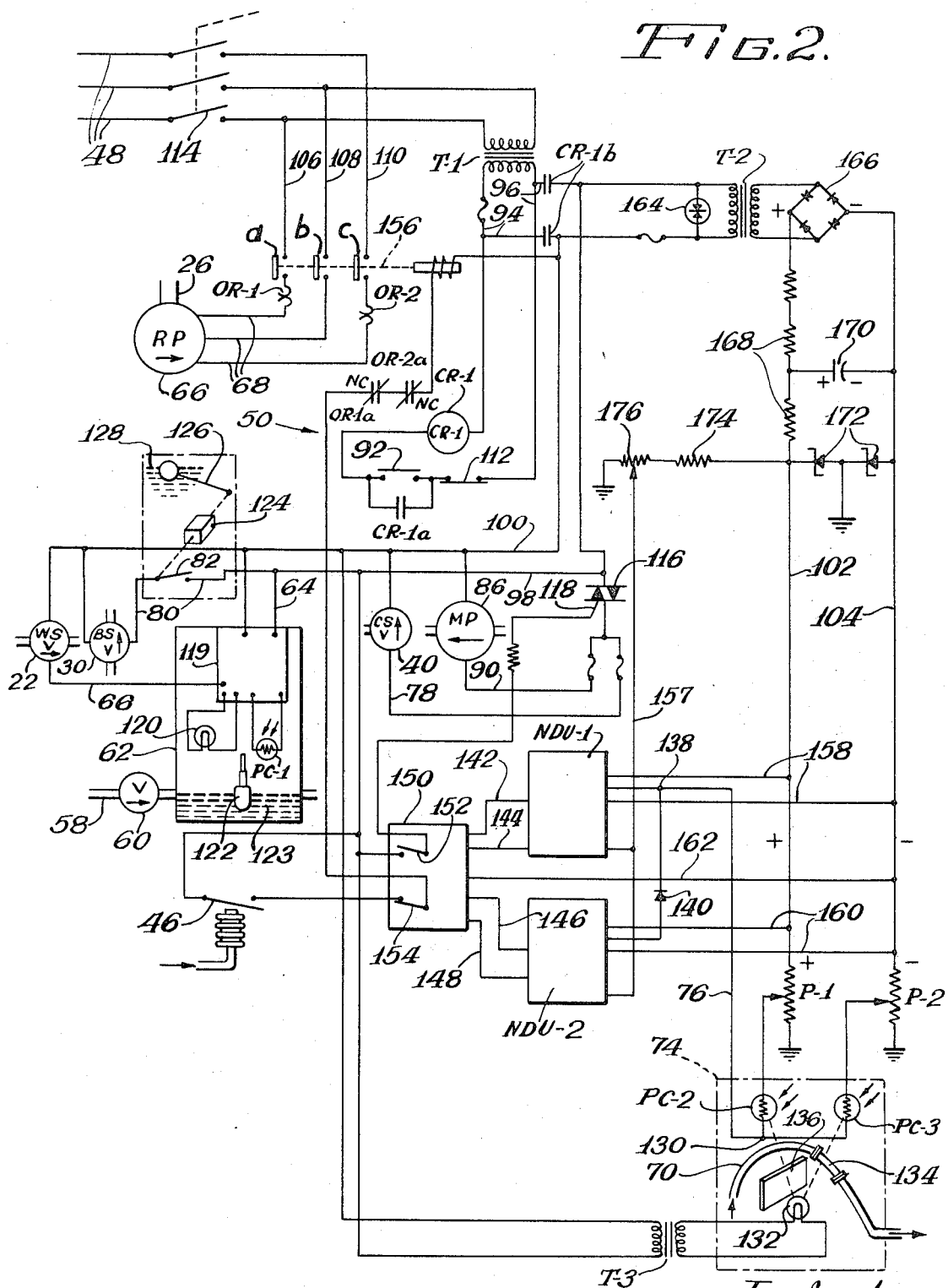
FIG. 2 is an electrical schematic view, showing the electrical circuit of FIG. 1 more in detail.

In FIG. 2, a starting circuit, including a start switch 92 and two electrical input lead wires 94 and 96, controls a primary circuit having two input lead wires 98 and 100, controls a secondary circuit having two input lead wires 102 and 104, and controls a third circuit having three input lead wires 106, 108, and 110.

STARTING CIRCUIT

The leads 94 and 96 of this circiut have connected, in series therebetween, a control relay CR–1, the start switch 92 with which a first set CR–1a of contacts of the control relay is connected electrically in parallel, and a stop switch 112 which is connected to the wire 96. Input to the starting circuit input leads 94 and 96 is supplied by the power wires 48, a three pole switch 114, and a transformer T–1.

The electrical control unit 50 is operated by the starting circuit. Specificially, the unit 50 is started in operation by pressing the starting circuit switch 92, the starting circuit is locked in due to a locking effect caused by the relay contacts CR–1a, and the electrical control unit is de-energized by pressing the stop switch 112 to open the circuit and de-energize the relay CR–1.

PRIMARY CIRCUIT

The input leads 98 and 100 of this circuit have connected, as the first component in a series therebetween, a triac bidirectional triode Thyristor switch 116, which is an SC40B semiconductor switch having a gating electrode 118. The other components in series with the switch 116 include, in electrically parallel relation to one another, the electrically operated acid metering pump 86 which is supplied with current by the conductor 90, and the electrically operated chlorine solenoid valve 40 having the separate interconnection 78.

The specific gravity responsive control 62 includes a photocell unit 119 which is connected between the input lead wires 98 and 100. Specifically, the unit 119 is supplied with current therefrom by means of the connection 64 and functions as a switch to supply part of that current through the connection 65, the water solenoid valve 22, and thence to the conductor lead wire 100. A lamp bulb 120 in the unit 119 shines light in a path onto a photocell PC-1 so as to prevent opening the valve 22. A hydrometer 122 which floats in a pool of etchant 123 is arranged so as to intervene and interrupt the light path. The etchant 123 is being continually replenished at a metered rate controlled by the valve 60, and the level remains constant in the specific gravity control 62. Increasing specific gravity indicative of more metal concentration in the etchant makes the hydrometer 122 rise, block the light, and cause the valve 22 to open, thus admitting the water into the etchant and diluting the accumulating metal. The density decreases, the float falls, and water flow discontinues until the hydrometer float regains its raised position and repeats the cycle.

The float controlled switch 82 is connected by a lost motion connection 124 to a float arm 126 that rides at the surface of the etchant 128 in the tank of the etcher 10. An increase in lever of this etchant causes the rising arm 126 to operate the lost motion connection 124, thereby closing the switch 82. The switch 82 closes the electric line 80 which connects the byproduct solenoid valve 30 across the input leads 98 and 100. The valve 30 opens and connects the regeneration pump 66, circuit 26, and first circuit branch 28 to the tank 24.

With the switch 82 closed and the valve 30 open, level of the etchant 128 gradually falls within the etcher tank until the slowly dropping arm 126 removes all lost motion from the connection 124 and thereupon opens the switch 82. The byproduct solenoid valve 30 closes, discontinuing further storage of etchant until the float arm regains its raised position and repeats the cycle.

Input to the lead wires 98 and 100 is supplied by the input leads 94 and 96, by two sets CR-1b of contacts of the control relay CR-1, and by conductors leading to the wires 98 and 100.

SECONDARY CIRCUIT

The secondary circuit is a filtered, 48 v. DC circuit, and the plus input wire 102 thereof is connected through a positive potentiometer P-1 to ground. The other input lead wire 104, a minus conductor, is connected through a negative potentiometer P-2 to ground. A reference photocell PC-2 in the colorimeter cell 74 is connected between a normally 0 v. photocell junction 130 and a slider on the positive potentiometer P-1, and a sample viewing photocell PC-3 is connected between the photocell junction 130 and the negative potentiometer P-2. Light is supplied in a second path and in a third path to the respective photocells by means of a lamp bulb 132. The lamp bulb is supplied with current from a transformer T-3, the primary windings of which are across the input lead wires 98 and 100.

Etchant in the second circuit branch 70 flows through a transparent plastic section of pipe 134 which intervenes in the third light path between the lamp bulb 132 and the photocell PC-3. Increasing cuprous chloride content darkens the etchant and reduces the light falling on the photocell PC-3, which is a photoresistor. Accordingly the resistance increases, causing the potential at junction 130 to change from zero volt to plus 0.1 volt or larger.

Conversely, when chlorinated etchant in the pipe 134 has a higher ratio of the cupric chloride ($CuCl_2$) and thus becomes lighter due to the relatively decreased cuprous ion concentration, the photocell PC-3 causes the voltage at junction 130 to change from zero volt to −0.1 volt or larger.

A filter plate 136 of predetermined darkness is interposed in the second light path, causing the photocell PC-2 to receive a reference value of light. The sliders on the respective potentiometers P-1 and P-2 are adjusted to such a point that when the degree of darkness of the reference filter 136 equals the degree of darkness of the etchant in the pipe 134, the voltage at junction 130 takes the desired zero value with respect to ground.

The interconnection 76 applies the photocell voltage from junction 130 to a junction 138 which is connected to a null detector unit NDU-1 directly and which is connected to a second null detector unit NDU-2 by means of a diode 140.

Four connections 142, 144, 146, and 148 lead from the respective units NDU-1 and NDU-2 to a relay box 150, for operating control and shut-down relay switches now to be described. A control relay switch 152 is connected between the input wire 98 and the gating electrode 118 of the triac switch 116 and is effective when electromagnetically closed to close the triac switch, causing simultaneous operations both of the chlorine solenoid valve 40 which it opens and of the acid metering pump 86 which it sets in operation.

A shut-down relay switch 154 in the box 150 and the chlorine pressure switch 46 are part of a series circuit, such circuit further including sets of overload relay contacts OR-1a and OR-2a, and a pump motor relay 156, and such circuit being connected between the input wires 98 and 100 of the secondary circuit. The relay switch 154 is closed under all conditions except emergency conditions of shut-down, and the pressure switch 46 is held closed by chlorine gas pressure when operating gas pressure is on the line.

The units NDU-1 and NDU-2 have a common plus 3 v. line 157 supplying positive bias voltage thereto. Two conductors 158 connect NDU-1 between the respective input wires 102 and 104, and two conductors 160 connect NDU-2 between the respective input wires 102 and 104. An interconnecting conductor 162 supplies −24 v. DC from the minus input wire 104 to the relay box 150.

Input to the input wires 102 and 104 of the secondary circuit is supplied in an electrically coupled path leading from the input lead wires 94 and 96, through the sets of relay contacts CR-1b, a transformer T-2 having a semiconductor clipper 164 bridging across the primary winding thereof, a full wave rectifier 166, a filter network including therein a series of resistors 168 and a capacitor 170 and having two limiter Zener diodes 172 connected between ground and the respective positive and negative sides of the network, and thence to the positive and minus wires 102 and 104. For supplying bias current, a resistor 174 and a series connected potentiometer 176 connect the positive lead wire 102 to ground, and the slider of the potentiometer 176 couples the plus 3 v. DC bias wire 157 to a point of that voltage on the potentiometer.

THIRD CIRCUIT

The interrelationship of this circuit and the just described secondary circuit is pronounced in the respect that this circuit includes, in series between a group of input wires 106, 108, and 110 thereto and the set of regeneration pump connections 68, a group of three sets of contacts a, b, and c of the pump motor relay 156, and a group of two motor overload relays OR-1 and OR-2 which operate the sets of relay contacts OR-1a and OR-2a that are in the secondary circuit. Because of this interrelationship, the regeneration pump 66 will shut down due to its deenergization by the pump motor relay 156, either when the shut-down relay switch 154 automatically operates to open the circuit to the relay 156, or when a drop of chlorine pressure opens the pressure switch 46, or when OR-1 or OR-2 automatically operates the overload contacts OR-1a or OR-2a to open the circuit to the relay 156.

NDU-1 CONTROL VOLTAGE—FIG. 3

In this null detector unit, an emitter follower transistor TR3 receives the photocell signal voltage which is applied as input to the junction 138. The emitter follower is necessary to prevent loading the photocells which are the source of the signal. A trigger transistor TR1 in a first Schmitt trigger circuit has a base junction 178 by which it is coupled to the emitter of the transistor TR3.

The first trigger transistor TR1 is coupled by a collector junction 180 thereof and a resistor 182 to the base electrode of a next trigger transistor TR2 in the first Schmitt trigger. A common resistor 184 connects the emitter electrodes of both trigger transistors TR1 and TR2 to ground so that they are emitter coupled.

The next trigger transistor TR2 is coupled by a collector junction 186 thereof and a resistor 188 to the base electrode of a power amplifier transistor TR4. The output appears at a final collector junction 190 of TR4 to which the start-stop connection 142 is connected.

A second Schmitt trigger circuit includes a trigger transistor TR1a therein and a next trigger transistor TR2a. The couplings among those transistors in the second Schmitt trigger circuit and among other transistors in that circuit are hereinafter described. Output appears at a final collector junction 204 of an inverter transistor TR5a to which the shut down connection 144 is connected. In brief, a positive photocell signal input at or above a predetermined value causes a −12 control voltage to appear on the start-stop connection 142, and a negative photocell signal input causes a −12 shut down voltage to appear on the connection 144.

More specifically, any photocell output voltage applied at the junction 138 is a triggering signal to the first and second Schmitt trigger circuits if it reaches plus .1 v. or if it reaches −.1 v. or more. But zero voltage and any applied voltage smaller than plus .1 v. and smaller than −.1 v. leave the two trigger circuits untriggered.

In untriggered condition, the first Schmitt trigger transistor TR1 is in a blocking state, the next trigger transistor TR2 in the first Schmitt trigger circuit is in conducting state, and the power amplifier transistor TR4 is in a conducting state. The voltage at the junction 178 "follows" the photocell output voltage because of the function of the emitter follower transistor TR3, and so a small voltage, e.g., between 0 v. and plus .1 v., applied to the transistor TR3 will appear in the output of transistor TR3 as too small a positive biasing current to cause the transistor TR1 to conduct. The voltage at the junction 180 has a high value, and consequently the resistor 182 supplies positive biasing current to the trigger transistor TR2 accounting for its conducting state. The voltage at the junction 186 has a reduced positive value due to current flow through the transistor TR2, and consequently the resistor 188 allows negative base biasing current to flow to the transistor TR4 accounting for its conducting state. Hence, the voltage at the final output junction 190 is 0 v. due to current flow through the transistor TR4 from ground.

The untriggered, zero output voltage in the start-stop connection 142 stops the regeneration action, by stopping flow of the chlorine gas and acid solution.

A triggering signal, e.g., any input signal of photocell voltage at or larger than .1 v., is applied by the emitter follower transistor TR3 to the junction 178 which biases the transistor TR1 with sufficient positive base current to trigger the transistor TR1 from blocking state to conducting state. Positive regeneration occurs. Firstly, the positive voltage of junction 180 reduces from the high value to plus 8 v. due to current flow through the transistor TR1, and the resistor 182 supplies reduced base biasing current to the next trigger transistor TR2 which therefore conducts less. Secondly, the consequent decrease in current through the emitter resistor 184 shared by the two trigger transistors TR1 and TR2 increases the base-emitter voltage of transistor TR1 due to its emitter becoming less positive, and the trigger transistor TR1 saturates whereas the next trigger transistor TR2 goes into blocking state. It will hereinafter be observed that each Schmitt trigger circuit when triggered by a signal of one algebraic sign will generate an output signal (e.g., at the junction 186) of 8 v. having the same algebraic sign as the triggering signal.

The voltage at the junction 186 having the previously noted reduced positive value rises to plus 8 v. due to the blocked trigger transistor TR2, and the resistor 188 no longer permits sufficient negative base biasing current to flow to the power transistor TR4 which therefore stops conducting and blocks. Hence, the voltage at the final output junction 190 changes from 0 v. to −12 v.

The triggered −12 output voltage in the start-stop connection 142 starts the regeneration action, with the chlorine gas and the acid solution flowing and continuing to flow as long as the photocell input voltage does not drop below plus .1 v.

Reduction of the input by the photocells to less than plus .1 v. causes restoration of the untriggered zero output voltage which stops regeneration, and thereafter the start-stop cycle is repeated in the start-stop connection 142.

NDU–1 SHUTDOWN—FIG. 3

An opposite triggering signal, e.g., any input voltage from the photocells at or larger than −.1 v., is applied by the emitter follower transistor TR3 to the junction 178, which negative voltage does not affect the transistor TR1 (npn type and hence unaffected) but which biases the pnp type trigger transistor TR1a of the second Schmitt trigger circuit with sufficient negative base current to trigger the transistor TR1a from a blocking state to conducting state. The next transistor TR2a of that second Schmitt circuit changes from its prior conducting state to a blocking state and the voltage at the adjacent collector junction 196 changes from 0 v. to −8 v., due to the fact that the junction 192 is less negative and the resistor 194 no longer applies adequately-negative base biasing current to drive the transistor TR2a and maintain it in the prior conducting state. The interaction between the emitter coupled trigger transistors TR1a and TR2a produces positive regeneration as the means of accomplishing the foregoing results, and the manner of so doing is believed obvious at this point.

The thus triggered −8 volts at the collector junction 196, while having the same algebraic sign as the input and, as well, the right algebraic sign (negative) for the desired operating purposes, is nevertheless too small in voltage and is available with too little impedance to be used as a relay operating source. So a power amplifier transistor TR4a which is provided is immediately effective so as to saturate because it is coupled to the junction 196 by a base electrode resistor 198, and a phase inverter transistor TR5a which is provided is immediately effective to block because it is coupled by a base electrode resistor 202 to the collector junction 200 of TR4a. TR5a therefore inverts the amplified signal so that the output at the final collector junction 204 is the desired triggered −12 v.

The connection 144 applies the voltage as a −12 shutdown voltage to the shut-down relay 154, holding the system pump inoperative until the condition is corrected and the voltage changes from −12 v. to 0 v.

NDU–2 SHUT DOWN—FIG. 3

A third Schmitt trigger circuit operates the same as the first Schmitt trigger, except that a higher positive voltage swing applied to an emitter follower transistor TR3b is necessary. The third Schmitt trigger circuit thus operates only subsequent to an operation of the first Schmitt trigger, but not necessarily every time after the first Schmitt trigger operates. More specifically, the positive voltage output from the photocells must rise sufficiently above plus .1 v. for the resulting inverse bias voltage across the diode 140 to cause reverse current to start flowing through the diode 140. In such case, a −12 v. output appears at a final collector junction 205 of the power transistor TR4b in the third Schmitt trigger circuit.

No utilization means is disclosed in the output of a fourth Schmitt trigger circuit which is illustrated, because the circuit is not necessary for immediate purposes of the present disclosure. It will be obvious that the output voltage of each of the four Schmitt trigger circuits will be −24 v. while unloaded, and that connecting the present relays as the load in the output thereof immediately loads each circuit so that the triggered output is −12 v. as desired.

Except where indicated to the contrary, all transistors are pnp type 2N527 transistors. The exceptions are transistors TR1, TR1b, TR2, and TR2b which are 2N388A transistors of the npn type.

Although referred to herein as Schmitt triggers and with such reference being true in the broad sense, technically the transistors TR1, TR2, TR1a, and so forth actually form bi-stable circuits analagous to the Schmitt cathode-coupled trigger circuit. Details of operation of the transistor version of the Schmitt circuit are described in Hakim and Barrett, "Transistor Circuits in Electronics," New York Hayden Book Co., Inc., New York, 1964, pp. 245–249.

RELAY BOX 150—FIG. 3

The −12 start voltage from the start-stop connection 142 is applied as a forward biasing voltage through a diode D2, and thence through a resistor 206 to the base electrode of a transistor TR6, which is caused to conduct. The transistor TR6 is otherwise in its blocking state because of a positive condition of the base due to the small positive voltage applied through the connection 148 and a resistor 208, and hence the relay switch contacts 152 are in their normally open state because the transistor controlled control relay 210 which operates the contacts is deenergized.

The −12 shut down voltage is applied through the connection 144 as a forward biasing voltage through a diode D4, and thence through a resistor 212 to the base electrode of a transistor TR7, which is caused to conduct. The transistor TR7 is otherwise in its blocking state because the base electrode is held slightly positive by the small voltage applied thereto by the connection 148 and a resistor 214, and hence the relay contacts 154 of a shut down relay 216 are in their normally closed state. That is to say, the transistor TR7 which controls the shut down relay 216 is in blocking state holding the relay deenergized.

The other −12 shut down voltage is applied through the connection 146 as a forward biasing voltage through a diode D5, the latter being coupled to the transistor TR7 which operates the shut down relay 216 causing the normally closed contacts 154 thereof to open.

When any of the aforesaid −12 v. potentials is applied, the appropriate diode is forward biased so as to conduct and cause operation of one or both of the relays 210 and 216. Specifically, the −12 start voltage from the start-stop conductor 142 establishes regeneration by causing closure of the control relay switch contacts 152 so as to set the chlorine and hydrochloric acid to flowing. The −12 shut down voltage from the connection 144 causes opening of the contacts 154 so as to shut down the regeneration pump whenever the negative input voltage becomes excessive.

The −12 shut down voltage from the connection 146 causes opening of the relay switch contact 154 to shut down the regeneration pump whenever the positive photocell input voltage becomes excessive.

One or more utilization means are thus provided in the foregoing apparatus for each sensed property or characteristic of the etchant solution and gas. The gas control 38 appropriately responds to inadequate etchant flow in the regeneration circuit, and the pressure switch 46 and the pump motor relay 156 respond to low gas pressure. The water valve 22 responds to high etchant density and the byproduct valve 30 responds to high etchant level. The acid pump and gas solenoid valve 40 respond to moderate changes of etchant color, and the pump motor relay 156 responds to excessively lightened or excessively darkened etchant.

Whenever the etcher is started up for a production run of articles, it can normally be assumed that the etchant has the correct strength and properties, being automatically sustained in the same generally fresh condition at all times. Of course when the etcher is filled for the first time upon being put in service initially, the composition of the etchant solution for convenience sake is preferably, but not necessarily, the appropriate metal halide in its most fully oxidized or freshest state and the balance water. Then almost immediately thereafter the dissolving metal causes the Baumé reading and the color of the etchant to start changing.

The overall operation of the system includes, in overlapping periods, adding or stopping the oxidizing gas, adding water to dilute the metal content in the etchant, and draining into storage the excess etchant accumulating during the redox process. The operation further includes emergency shut down, if and as necessary, and also optionally adding hydrochloric acid when potential precipitation is involved.

Water is added so that, under automatic operation of the specific gravity control 62, a range of 32° and 38° Baumé is maintained, the preferred range being 33° to 35° Baumé. The most convenient range in the tank, under operating conditions of a fifty gallon capacity continuous etcher 10, was an etchant level between 14" and 16", the transfer of etchant commencing when the level in the tank was at or above 16" and being discontinued at or below 14".

As a generalization with either iron chloride or copper chloride, the aim was to keep cutting the etching solution to maintain, to within about ¼ oz. either way, an approximate concentration of metal in the etching bath of ¼ oz. per gallon.

The use of a reference photocell PC2 and a sample photocell PC3 has several advantages and contributes to the flexibility of the machine. If the light source dims, both cells adjust equally thereto without error. It involves no more than the substitution of a proper filter plate 130 in the colorimeter cell 74 in order to accommodate a particular kind of dissolved metal and to establish the fresh-exhausted range desired. The preference is at all times to keep a high ratio of the metal chloride in the fully oxidized state of its fresh condition, and in comparison thereto to the metal chloride in the oxidized state of its exhausted condition was kept down in the range, for example, of about 0.8% and 1.8% by weight when using copper chloride.

As one preferred form, green tinted plexiglass is substituted when copper chloride is being chlorinated, and the darkness of the green tint will determine the maximum proportion of cuprous ion allowed to concentrate in the solution before chlorination starts. A brown tinted plexiglass filter is used for the iron chloride, the relation preferably being in each case that the filter color has the same spectral response as the particular etchant. Copper chloride is essentially green and iron chloride is essentially brown. Maintaining close limits of dissolved metal concentration and a high ratio of fresh to exhausted metal chloride insures uniform etch rate in the machine.

The emergency shut down condition occurs when the etchant becomes excessively dark indicative that there is present an excessive proportion of metal ion in the oxidation state of its exhausted condition, or when the etchant becomes excessively light in color indicative that there is present an excessive proportion of metal ion in the oxidization state of its fresh condition, or when gas pressure drops excessively low as sensed by the pressure switch 46, or when the motor overload relay 156 is deenergized. The gas control 38 senses the shut down condition because of the regeneration pump stopping, and hence when etchant flow in the regeneration circuit stops, the gas flow also stops. Pump shut down causes the operator to take notice, and he shuts down the balance of the apparatus until the shut down condition is corrected.

Automatic regeneration such as the foregoing allows the etcher to be operated continuously, which is a decided economic advantage over the batch type etcher such as requires shut down in order to replace exhausted etchant with each fresh batch.

Variations within the spirit and scope of the invention described are equally comprehended by the foregoing description.

What is claimed is:

1. Apparatus for continuous etching of metal-surfaced articles with a supply of etchant containing an aqueous polyvalent metal halide, said polyvalent metal halide being a member selected from the group consisting of ferric chloride, ferrous chloride, cupric chloride, and cuprous chloride, comprising:
   (a) regeneration circuit means for circulating said etchant supply;
   (b) halogenating means for maintaining said etchant in a high-ratio in the oxidation state of its fresh condition, said halogenating means being connected to and controllable by said regeneration circuit means, and operative for automatically admitting a halogen into said supply only when said supply is being circulated, to re-oxidize exhausted etchant;
   (c) etchant density means coupled to said regeneration circuit means and operating upon said etchant supply for automatically maintaining the specific gravity of said etchant within a predetermined range by introducing water into said supply;
   (d) etchant withdrawal means coupled to said regeneration circuit means for maintaining the supply of said etchant within a predetermined range by automatically withdrawing from said supply excess generated etchant;
   (e) acidifying means operative for admitting and maintaining, without exceeding a predetermined limit thereof, an effective concentration of hydrohalic acid in said supply for prevention of precipitation;
   (f) said halogenating means and said acidifying means having an interconnecting control to admit said halogen and acid simultaneously to said supply of etchant; and
   (g) photocell sensing means for sensing an optical characteristic of said etchant and having an electrical output corresponding to said sensed optical characteristic, which electrical output is operatively coupled to and controls said halogenating means and said acidifying means.

2. Apparatus according to claim 1 wherein said photocell sensing means comprises a light source, a reference photocell and a sample photocell, said reference photocell cooperating with a filter having a reference color corresponding to the color of said etchant when in said fresh condition and producing a reference electrical signal corresponding to such color, and said sample photocell means being operative to monitor the color of said etchant, said reference photocell and said sample photocell cooperating to monitor the color of said etchant in comparison with said reference color.

3. Apparatus according to claim 1 wherein said regeneration circuit means includes pump motor means for circulating etchant, and switch control means responsive to electrical signals from said photocell sensing means, said switch control means connected to said pump motor means to cause said pump motor means to respond to the existence of etchant having a color condition outside of predetermined color limits.

4. Apparatus according to claim 1 wherein said etchant density means comprises a light source, photocell means and a hydrometer, said hydrometer being disposed with relation to and cooperating with said light source and photocell means to provide a measurement of the specific gravity of said etchant.

5. Apparatus for the continuous etching of metal-surfaced articles in an etchant tank with an etching solution having an agent which is a polyvalent metal halide of said article metal, said polyvalent metal halide being a member selected from the group consisting of ferric chloride, ferrous chloride, cupric chloride and cuprous chloride, comprising:
   (a) regeneration circuit means for circulating said etching solution, having a regeneration pump;
   (b) diluting means connected to said etchant tank for automatically diluting said etching solution in accordance with the sensed specific gravity of the etching solution, having a specific gravity control circuit to admit water to said solution when the concentration of dissolved metal exceeds a predetermined limit;
   (c) byproduct means connected to said regeneration circuit including a float operated control circuit for storing regenerated etchant solution when the level of same in said etchant tank exceeds a predetermined limit;
   (d) halogenating means connected to said regeneration circuit for regenerating said etching solution to maintain same in a fully oxidized state, by introducing elemental halogen into said etchant solution;
   (e) acidifying means connected to said regeneration circuit operative for admitting and maintaining, without exceeding a predetermined limit thereof, an effective concentration of hydrohalic acid in said etchant supply for prevention of precipitation; and
   (f) colorimeter means for sensing the color of said etching solution and comparing said sensed color with a reference color, being operatively connected with and controlling said halogenating means and said acidifying means.

6. Apparatus according to claim 5 wherein said colorimeter means includes null detector circuit means connected to said regeneration pump to cause same to respond to the existence of etchant having a color condition outside of predetermined color limits, and connected to an electronic switch which interconnects said halogenating means and said acidifying means causing concerted operation of same, and said halogenating means contains a control system operative to introduce said halogen only when said etching solution is being circulated by said regeneration circuit means.

References Cited

UNITED STATES PATENTS

| | | | |
|---|---|---|---|
| 2,886,420 | 5/1959 | Jones et al. | 156—19 |
| 2,927,871 | 3/1960 | Mancke et al. | 134—10 |
| 3,401,068 | 9/1968 | Benton | 156—345 |

JACOB H. STEINBERG, Primary Examiner

U.S. Cl. X.R.

156—19; 134—10

PO-1050
(5/69)

UNITED STATES PATENT OFFICE
CERTIFICATE OF CORRECTION

Patent No. 3,526,560          Dated September 1, 1970

Inventor(s) John P. Thomas

It is certified that error appears in the above-identified patent and that said Letters Patent are hereby corrected as shown below:

Column 1, line 4, before "College" insert --State--.
Column 3, line 67, change both occurrences of $3FeCl_3$ to
       --$3FeCl_2$--.
Column 4, line 36, change "circiut" to --circuit--.
Column 5, line 19, change "lever" to --level--.

SIGNED AND
SEALED
NOV 17 1970

(SEAL)
Attest:

Edward M. Fletcher, Jr.
Attesting Officer

WILLIAM E. SCHUYLER, JR.
Commissioner of Patents